(12) United States Patent
Nutaro et al.

(10) Patent No.: US 8,073,580 B2
(45) Date of Patent: Dec. 6, 2011

(54) STANDBY INSTRUMENT SYSTEM

(75) Inventors: Joseph J. Nutaro, Phoenix, AZ (US);
Steven P. Grothe, Cave Creek, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 664 days.

(21) Appl. No.: 11/929,111

(22) Filed: Oct. 30, 2007

(65) Prior Publication Data
US 2009/0112380 A1    Apr. 30, 2009

(51) Int. Cl.
*G01C 23/00* (2006.01)
*G01C 21/20* (2006.01)
*G06F 3/147* (2006.01)

(52) U.S. Cl. .......................... 701/15; 340/971
(58) Field of Classification Search .................. 701/15; 340/971
See application file for complete search history.

(56) References Cited

U.S. PATENT DOCUMENTS

| | | | | |
|---|---|---|---|---|
| 4,598,292 | A * | 7/1986 | Devino | 340/973 |
| 5,297,052 | A * | 3/1994 | McIntyre et al. | 701/220 |
| 6,654,685 | B2 * | 11/2003 | McIntyre | 701/213 |
| 6,832,138 | B1 * | 12/2004 | Straub et al. | 701/3 |
| 2003/0130791 | A1 * | 7/2003 | McIntyre | 701/213 |
| 2004/0236481 | A1 * | 11/2004 | Saint-Aroman et al. | 701/3 |

OTHER PUBLICATIONS

Wikipedia contributors, "ARINC 429," Wikipedia, The Free Encyclopedia, http://en.wikipedia.org/w/index.php?title=ARINC_429&oldid=390468223 (accessed Oct. 27, 2010).*
"ARINC 429 Bus Interface" (PDF). Actel. http://www.actel.com/ipdocs/CoreARINC429_DS.pdf. Retrieved Oct. 26, 2010.*
Wikipedia contributors, 'Picture-in-picture', Wikipedia, The Free Encyclopedia, Feb. 12, 2011, 21:43 UTC, <http://en.wikipedia.org/w/index.php?title=Picture-in-picture&oldid=413563102> [accessed Feb. 26, 2011].*

* cited by examiner

*Primary Examiner* — Mark Hellner
*Assistant Examiner* — Ari M Diacou
(74) *Attorney, Agent, or Firm* — Ingrassia Fisher & Lorenz, P.C.

(57) ABSTRACT

An augmented air data and inertial reference system (AA-DIRS) serving as a standby instrument on an aircraft is provided. A secondary air data and inertial reference system (ADIRS) includes a secondary air data module coupled to a secondary inertial reference module. The secondary air data and inertial reference system is configured to derive secondary air data and inertial reference data using the secondary air data module and the secondary inertial reference module. The secondary inertial reference system is further configured to provide the second air data and inertial reference data to a flight control system for use as a backup source of data for control of the aircraft. A graphics module is coupled to the secondary air data and inertial reference system and a display. The graphics module is configured to receive the secondary air data and inertial reference data and process the secondary air and inertial reference data.

23 Claims, 7 Drawing Sheets

FIG. 7

STANDBY INSTRUMENT SYSTEM

TECHNICAL FIELD

The present invention relates to aircraft instrumentation, and more specifically, but not exclusively, to an improved standby instrument system.

BACKGROUND

Many types of aircraft use standby instruments visible to the flight crew for situations that result when the main instrumentation fails or is disabled. This traditionally requires that the standby instrument(s) consist of a distinct system of electronics, sensors, and displays. In some cases two systems are required to allow viewing by multiple crew members or to show different data. These standby systems are much simpler than the main instrumentation as they provide only a minimal amount of data, yet they add significant cost and complexity to the aircraft. A solution is needed to obtain the same or better standby instrument functionality without the need to add complete systems comprised of dedicated equipment.

BRIEF SUMMARY

In one embodiment, and by way of example only, an augmented air data and inertial reference system (AADIRS) serving as a standby instrument on an aircraft is provided. A secondary air data and inertial reference system (ADIRS) includes a secondary air data module coupled to a secondary inertial reference module. The secondary air data and inertial reference system is configured to derive secondary air data and inertial reference data using the secondary air data module and the secondary inertial reference module. The secondary inertial reference system is further configured to provide the second air data and inertial reference data to a flight control system for use as a backup source of data for control of the aircraft. A graphics module is coupled to the secondary air data and inertial reference system and a display. The graphics module is configured to receive the secondary air data and inertial reference data and process the secondary air and inertial reference data to generate graphics data. The graphics module is further configured to provide the graphics data to the display to generate backup instrumentation on the display.

In another embodiment, again by way of example only, a standby instrument on an aircraft is provided. The standby instrument includes means for deriving secondary air data and inertial reference data using a secondary air data module and a secondary inertial reference module, means for providing the secondary air data and inertial reference data to a flight control system for use as a backup source of data for control of the aircraft, means for processing the secondary air data and inertial reference data to generate graphics data, and means for providing the graphics data to a display to generate backup instrumentation on the display.

In still another embodiment, again by way of example only, a method for displaying standby instrument data on an aircraft is provided. The method includes deriving secondary air data and inertial reference data using a secondary air data module and a secondary inertial reference module, providing the secondary air data and inertial reference data to a flight control system for use as a backup source of data for control of the aircraft, processing the secondary air data and inertial reference data to generate graphics data, and providing the graphics data to a display to generate backup instrumentation on the display.

In still another embodiment, again by way of example only, a standby instrument having a display is provided. The standby instrument includes a flight control system providing secondary air data and inertial reference data, and a graphics module coupled to the flight control system and the display. The graphics module is configured to receive the secondary air data and inertial reference data and process the secondary air data and inertial reference data to generate graphics data. The graphics module is further configured to provide the graphics data to the display to generate backup instrumentation on the display.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Typically, flight deck standby instruments address three primary conditions. The first is a loss of all of the flight crew's main instruments due to component failure, electrical failure, or other physical conditions. The second is a disagreement between main instrument displays which requires a third instrument as a cross-check. An example of such a disagreement may be a situation where the captain's and first officer's main instrumentation show differing altitudes.

The third condition refers to main instruments failing, not due to a component failure as seen in the first condition, but due to some "generic" or very unlikely and unforeseen event which causes the loss of main instruments. An example of such an unforeseen event might be a catastrophic and simultaneous display drive circuit failure at a narrow temperature range and airplane power input that was never observed in previous flights or tests. This drives a desire that the standby instruments be of a dissimilar design to avoid the generic failure of the main instruments.

Standby instruments must also satisfy several constraints. The instruments must be available for view without crew action. In addition, the instruments must be powered properly in the case of the loss of main aircraft power. Concerns regarding these constraints came to the forefront with the advent of the all glass flight deck where traditionally separate standalone instruments (e.g., altimeter and airspeed) were integrated into a graphical display such as a Primary Flight Display (PFD).

The present description and following claimed subject matter, in part, describe the implementation of standby functionality without adding completely separate systems, thus saving weight, volume, power and cost. This is accomplished by synthesizing the standby function within the existing aircraft systems. More specifically, advantage is taken of elements in the main instrumentation, with the addition of selected standby elements incorporated into existing equipment.

Assuming properly selected and configured main instrumentation, this results in a small amount of standby electronics which "piggy-back" onto existing systems. Dissimilarity is satisfied as the main systems already have dissimilar elements for other reasons.

Although a standby instrument system is generally much less complicated than main instrumentation due to the reduced data displayed to the crew, a standby instrument system reproduces nearly all of the same elements as the main instrumentation system. With the proper selection of main systems and instrumentation, and the proper subdivision of respective standby elements, the need for a dedicated standalone standby system can be reduced or eliminated.

Figure 1:
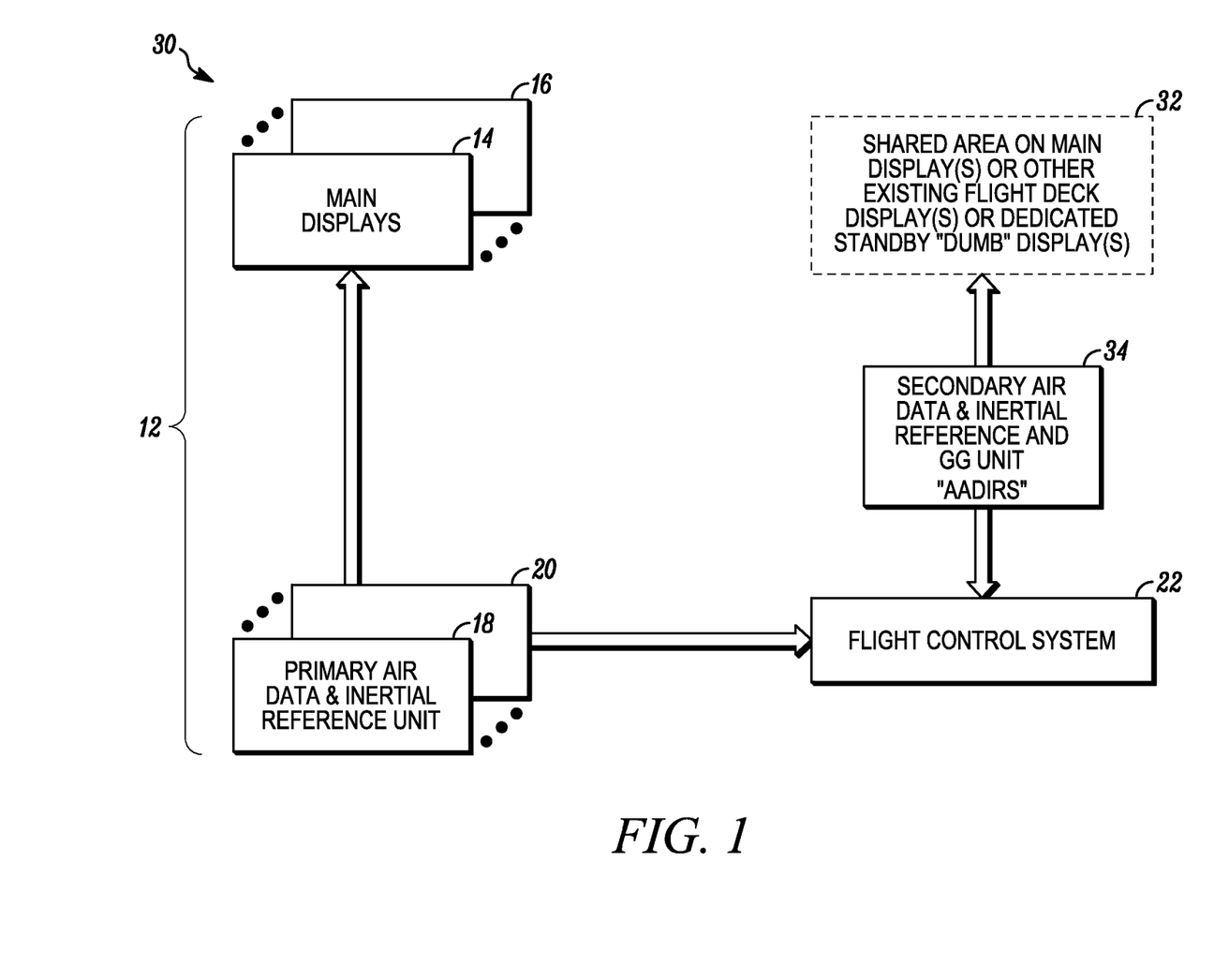
FIG. 1 is a block diagram of an exemplary aircraft-level architecture.

FIG. 1 shows a exemplary aircraft-level system architecture 30. A set of main displays 14 and 16 provide main instrumentation data to a captain and first officer. A set of primary sensors 18 and 20 may include a primary air data unit, a primary inertial reference unit, or other primary sensors. Data from these sensors is provided to the flight control system 22. The primary air data unit provides such information as altitude and airspeed. The primary inertial reference unit may contain gyroscopes, similar devices, or connections to a plurality of sensors which provide information relating to the orientation of the aircraft in three-dimensional space.

A box 32 is shown representing standby display functionality 32. The functionality 32 may be embodied in various ways. For example, the display functionality 32 may utilize a shared area on the main display(s). The display functionality 32 may utilize other existing flight deck display(s). The display functionality 32 may use a dedicated standby "dumb" display(s). Use of the term "dumb display" may refer to a display device containing a minimum amount of electronics to drive a display. In one embodiment, a dumb display may be similar to a typical monitor for a desktop computer.

In a departure from the prior art, the existing secondary air data system (ADS) and inertial reference unit (IRS) (denoted collectively as a secondary inertial reference system or secondary ADIRS) for the aircraft is combined with a graphics generator (GG) module (represented as box 34). Box 34, having combined GG capabilities and IRS functionality, may be referred to as a standby module 34 or an augmented air data and inertial reference system (AADIRS) 34. The AADIRS 34 may also contain or use other sensor inputs.

By adding graphics generation capabilities to existing redundant sources of air data and inertial reference data, the architecture 30 reduces or eliminates the need for a dedicated standalone standby instrument system. The secondary air and inertial reference data may then be passed to the flight control system 22, satisfying the flight control system's continuing need for redundant data. In addition, AADIRS 34 is of a different design than the aircrafts existing inertial reference system (IRS) and thus provides dissimilarity.

Figure 2:
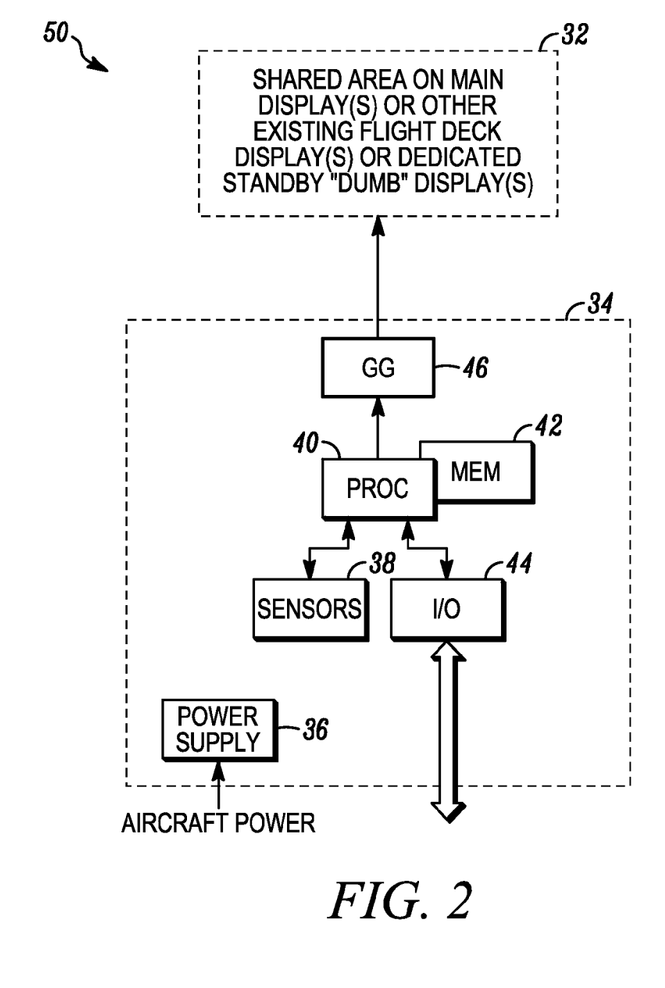
FIG. 2 is a block diagram of a first exemplary embodiment of standby instrument architecture.

FIG. 2 illustrates an exemplary embodiment 50 of standby instrument architecture. Inertial reference and air data sources are provided through the use of the existing air data and secondary inertial reference system (existing secondary ADDIRS) of the aircraft. The need for additional inertial reference data or air data sources usually provided to a standalone standby instrument is eliminated.

The AADIRS 34 may include a secondary air data system (ADS) coupled to a secondary inertial reference system (IDS) (see also AADIRS 34, FIG. 1). The secondary AADIRS 34 may be configured to derive secondary sensor data using the secondary air data module and the secondary inertial reference module. The secondary AADIRS 34 may be further configured to provide the second air data and inertial reference data to a flight control system for use as a backup source of data for control of the aircraft. A graphics module 46 receives the secondary air data and inertial reference data and processes the secondary data to generate graphics data. The graphics module may then provide the graphics data to the display functionality 32 to generate backup instrumentation on the display functionality 32. The display functionality 32 may be a main display panel, an alternate display panel, a portion of either main and alternate display panels, or both.

Referring again to FIG. 2, a secondary AADIRS having an associated standby GG module (AADIRS 34) is depicted. A power supply, control, and/or chassis component is shown as power supply 36. Power supply 36 is connected to the aircraft power system and/or backup power system. The secondary sensors 38 are associated with the secondary IRS and secondary ADS (ADIRS). Additional sensors once associated with a standalone standby system are eliminated. The aircraft's secondary ADIRS provides a different signal path than the signal path from the aircraft's primary ADIRS for computing the minimal data needed for the standby functionality 32. Such components as processing and graphics generation electronics and input conversion electronics are incorporated into the AADIRS 34 as a processor 40, memory 42, input/output (I/O) 44, and GG 46.

The combination of primary and secondary ADS and IRS systems, if selected partially for other system reasons (such as lower cost than an implementation using all primary IRS systems, support for critical fly-by-wire functionality or autoland functionality) can be used to synthesize the standby functionality with little added cost.

According to federal regulations, appropriate standby instrumentation must be visible to both captain and first officer. The instrumentation must be available without flight crew action in the event of a main instrument failure. To satisfy these regulations, one or more separate standby displays may be positioned on the flight deck instrument panel. However, if the added displays take up too much space, alternate displays may be used.

As explained previously, the display functionality 32 may be implemented in a variety of ways. For example, a portion of the existing main display may be dedicated to the display of standby information. An additional existing function display such as a radio tuning panel or heads-up-display (HUD) may be implemented. A dedicated standby display may be implemented which is hidden under normal conditions, but is selectively made visible by various means (e.g., folds downwards to be visible), even if the display covers a failed main display.

Figure 3:
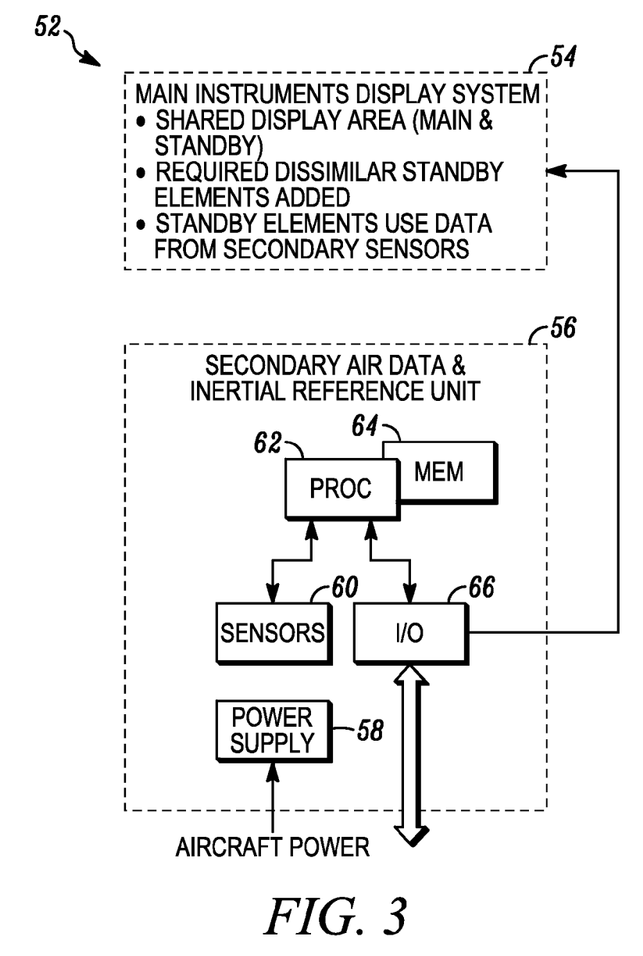
FIG. 3 is a block diagram of a second exemplary embodiment of standby instrument architecture.

An alternate reallocation of the standby display systems functionality is shown in FIG. 3. Architecture 52 includes similar elements shown in FIG. 2 previously, such as a secondary air data and secondary inertial reference module (secondary ADIRS module) 56. In the depicted architecture 52, an existing main instrument system display unit 54 is utilized that already includes processing and graphics generation required to produce the main instrument system display formats for the display unit. In other words, the graphics generation (GG) functionality seen previously integrated into box 34 may be integrated into or associated with box 54. With appropriate mechanisms to ensure the required independence of the standby function, the main display unit 54 can be partitioned and segmented to accommodate the addition of the necessary elements for implementing the standby display function (e.g., processing, graphics generation and display).

Since graphics generation capabilities are integrated into the main instruments display system 54, a GG unit is not integrated into or associated with the secondary IRS module 56. Module 56 does include, however, a power supply 58 connected to an aircraft primary or backup power supply system, sensors 60, and processing capability for the sensors 60 embodied in a processor 62, memory 64, and an I/O port 66 which transmits the processed sensor data to the display system 54 as shown.

Various embodiments may be implemented which transfer elements from a typical backup system, or eliminate the elements using functionality from other aircraft systems. In one embodiment, if the aircraft contains a fly-by wire flight control system, typically the flight control system has already addressed dissimilarity constraints by using, in most cases, two types of processors, two types of IRS units, other rate sensors and accelerometers, two types air data modules, and the like. Thus, assuming selected elements are placed on an aircraft emergency power/battery power bus, this system can be used to drive a small inexpensive dissimilar display(s) in the flight deck as a standby instrument. This display can be "dumb" with the graphics generation done in the flight control system, or the graphics generation can be done in the display itself.

With reference to a second exemplary embodiment, it is not unusual for commercial aircraft to contain two types of primary ADIRS units with different sensor and computational approaches. Typically there are two primary ADS and IRS units of a first type and second ADS and IRS units of another, less expensive, type. One of the units can be augmented (AADIRS) to perform air data calculations as well as contain a graphics generator to drive an inexpensive dumb display(s). This is less expensive than using stand-alone standby instrument functionality.

With reference to a third exemplary embodiment, rather than driving an independent display(s) which takes up valuable space on the flight deck panel, the AADIRS or standby module may be configured to drive alternate existing panel displays such as in a radio management unit. An SBI may be provided on one of the main displays which are typically large and numerous (4 to 6). The constant display of perhaps 2" by 2" for the standby image (SBI) is acceptable especially if, for example, the lower left corner of the main display is used for system monitoring and synoptic. The constant display along with the AADIRS may be connected to the emergency/battery power bus. To address a concern that a generic error could still exist that would impact the SBI, a different main display type may be implemented for the main display having the SBI.

With reference to a fourth exemplary embodiment, a fully analyzable display may be implemented for the main displays so that high confidence exists that the main displays do not have a common mode generic error. As an extra level of confidence, the SBI may be made available on a dissimilar alternate display (such as a radio management panel) by the crew (or an automated process) enabling a switch. This duplicate display of data can be used in any of the flight phases considered critical (e.g., takeoff and landing) to mitigate the concern of still having a generic error that was not analyzable.

This approach has the advantage that the standby primary flight display (PFD) can be expanded during critical flight phases by the crew to occupy the full main displays. For added safety, this provides a large image in a convenient space for the flight crew to scan rather than the smaller typical standby displays which, due to flight deck constraints, are typically not located for optimal viewing. As an alternative or backup, the SBI can also be on the alternate display in full size.

With reference to a fifth exemplary embodiment, the SBI may be positioned on an alternate display at all times. Then, during the critical flight phase, the SBI may be switched to a main display for an enlarged image, or switched to the main display if the alternate display failed. Such an implementation compromises the requirement of a standby instrument having always to be in view without crew action with a situation of the alternate display not being in a comfortable place to fly. In the alternative, the standby PFD could be displayed full time on one of the alternate displays at full size, if desired. One or more of several possible alternate displays or redundant displays may be utilized.

Figure 4:
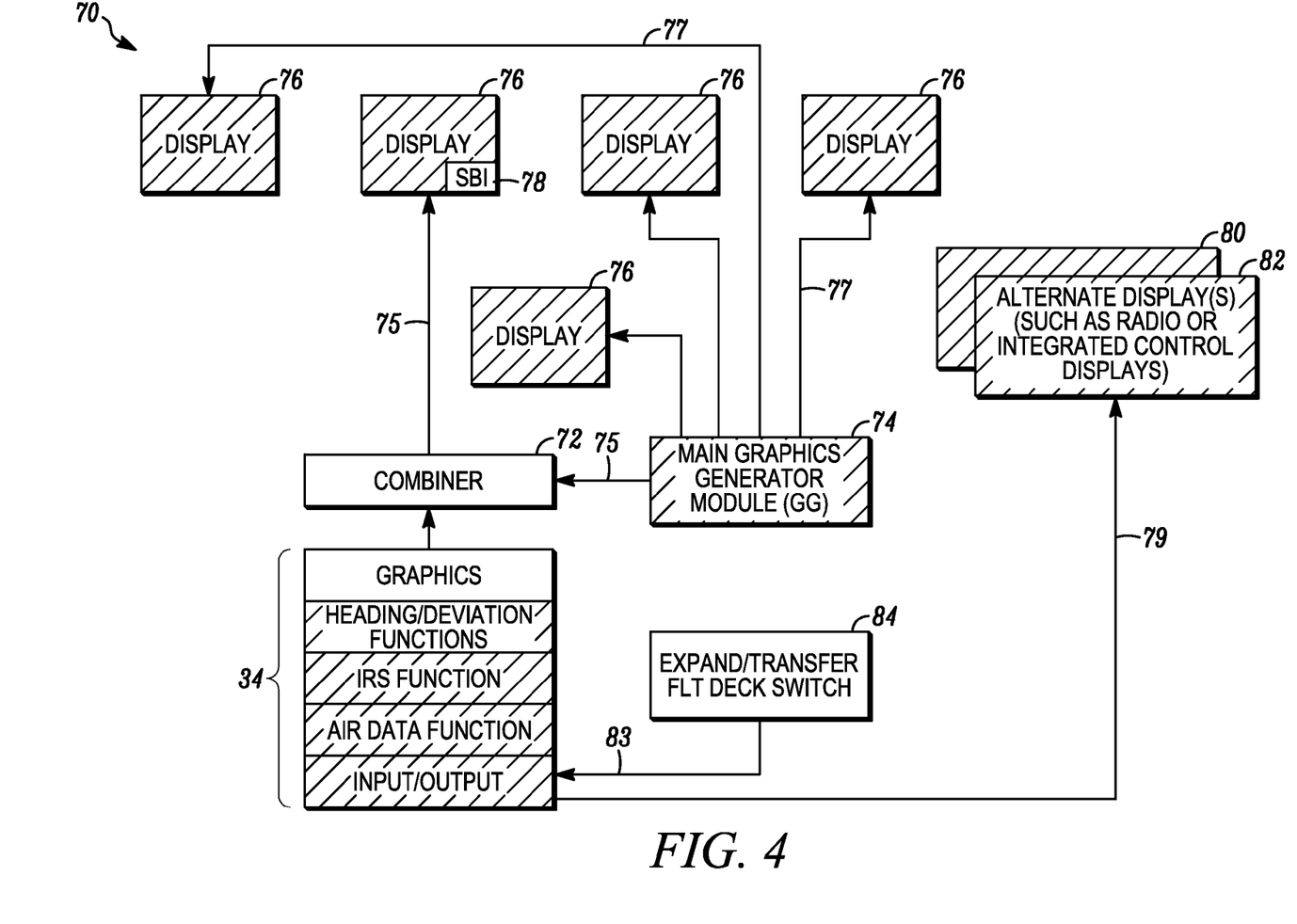
FIG. 4 is a block diagram of a third exemplary embodiment of a standby instrument architecture.
Figure 5:
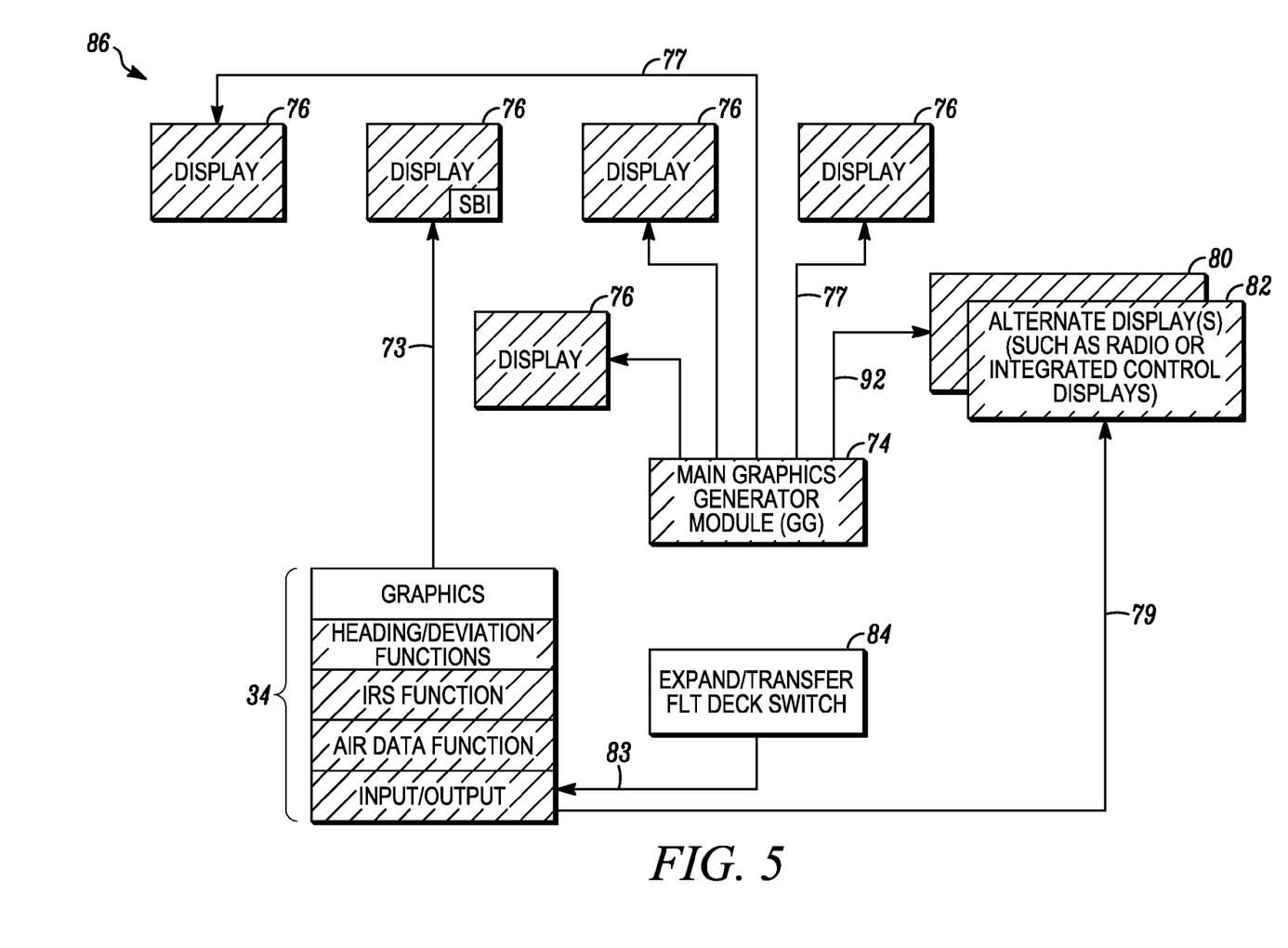
FIG. 5 is a block diagram of a fourth exemplary embodiment of a standby instrument architecture.
Figure 6:
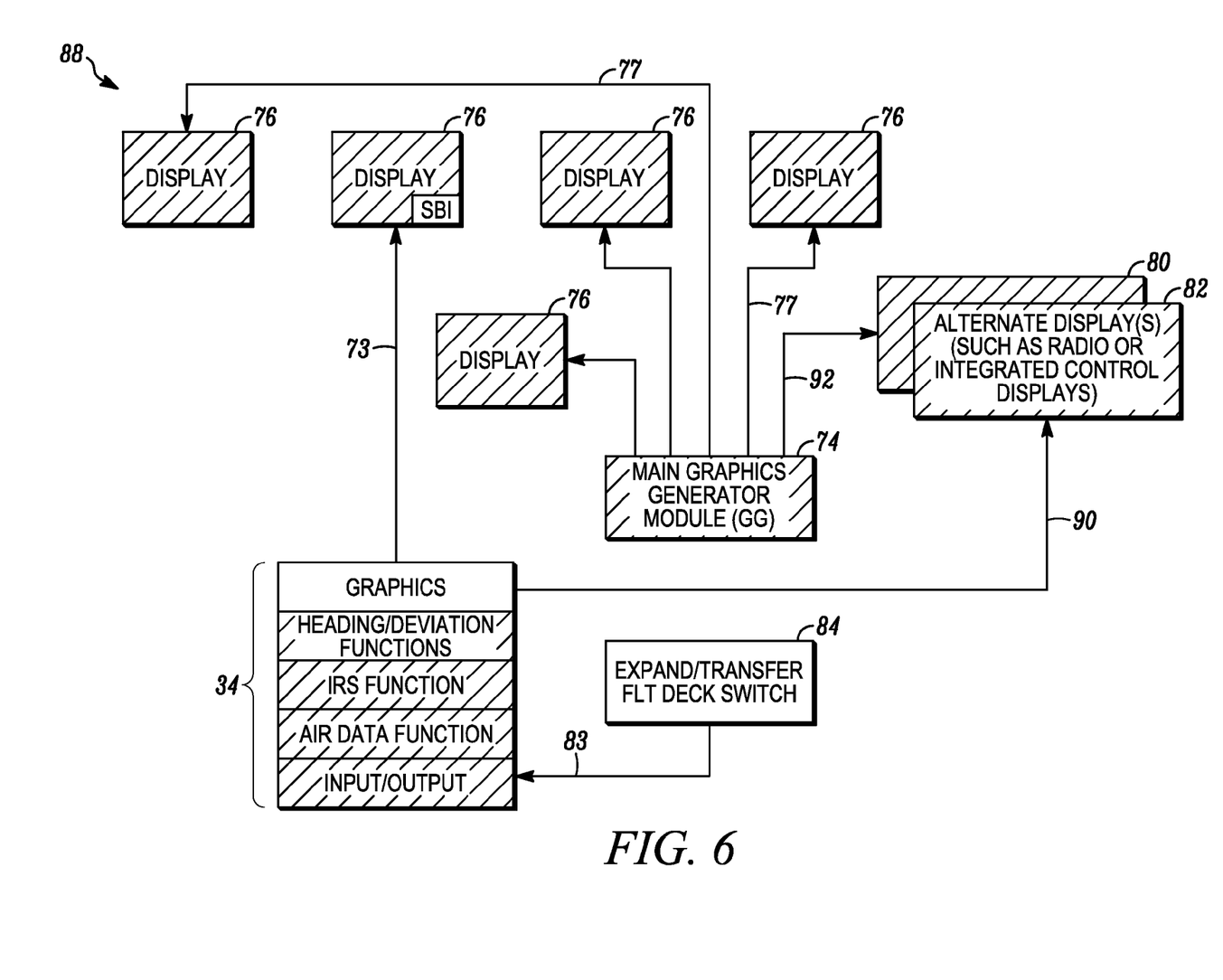
FIG. 6 is a block diagram of a fifth exemplary embodiment of a standby instrument architecture.

FIGS. 4, 5, and 6, following, depict various additional exemplary embodiments of a standby instrument architecture. FIG. 4 depicts an architecture 70 utilizing a combiner 72 positioned between a main graphics generator module (GG) 74 and one of the main displays 76. The combiner 72 may be, and typically will be located, within AADIRS 34. For the selected display of a number of main displays 76, the output of a main display graphics generator (GG) 74 may be used to transmit data through a pixel bus 75 shared with the AADIRS 34. The AADIRS 34 includes such functionality as dissimilar graphics capabilities, heading/deviation functionality, IRS functionality, air data functionality, and input/output functionality as has been previously described. The AADIRS 34 may insert the pixels for the standby instrumentation into the pixel stream via pixel bus 75. The alternate displays 80 and 82 also have AADIRS inputs to receive data via data bus 79.

Graphics data is generated by the AADIRS 34. The combiner 72 receives pixel data passed from the GG 74 through pixel bus 75. The combiner may combine, add to, or overwrite the data passed from the GG 74 using data from the AADIRS 34. The SBI is then transmitted over pixel bus 75 to the SBI portion 78 of a selected main display 76. If the main GG 74 fails, the standby data is still transmitted from the AADIRS 34 and displayed on the SBI 74 portion of display 76. If any of the displays 76 fail, the SBI is still available on the alternate display(s) 82. The SBI display may be configured to expand, reduce, or transfer the image presented on the display 76 by means of a switch 84 which can be manual or automatic.

Additional exemplary architecture 86 is depicted in FIG. 5. As an alternative to using a combiner as previously described, the main display(s) 76 may be configured to select either or both of a graphics output via pixel bus 73 from AADIRS 34 or a graphics output via main display interfaces 77 from GG 74. The alternate displays 80 and 82 continue to have an AADIRS input via data bus 79. The main display(s) 76 may then be configured to perform the selection functionality and/or combining/addition/overwriting functionality performed by a combiner located within them. As a result, a combiner 72 is not depicted. Here again, a flight deck switch 84 may be provided to enlarge, reduce, or switch an SBI image.

Additional exemplary architecture 88 is depicted in FIG. 6. The various functionality shown in FIG. 6 is similar to that shown in FIG. 5, such as the transmission of display data over pixel bus 73 to a selected display 76, and the transmission of display data over main display interfaces 77 to displays 76 from GG 74, as well as a switch 84. In addition, however, the GG 74 may be configured to drive the main display(s) 76 and the alternate displays 80 and 82 over an additional main display interface 92. In addition, the AADIRS 34 may be configured to drive the alternate displays 80 and 82 via pixel bus 90. Alternate displays 80 and 82 may have incorporated selection functionality to choose between the main display interface 92 and pixel bus 90.

Another departure from existing art may be realized if the aircraft contains a flight control system with sufficient dissimilar elements and uses dissimilar ADS and IRS units as inputs. If the aircraft is configured as described, the flight control may drive a standby "smart display," or alternatively, the flight control may contain the dissimilar graphics capabilities to drive a "dumb" display. Finally, the flight control may contain a combiner and perform similarly to the previously described AADIRS embodiments.

Figure 7:
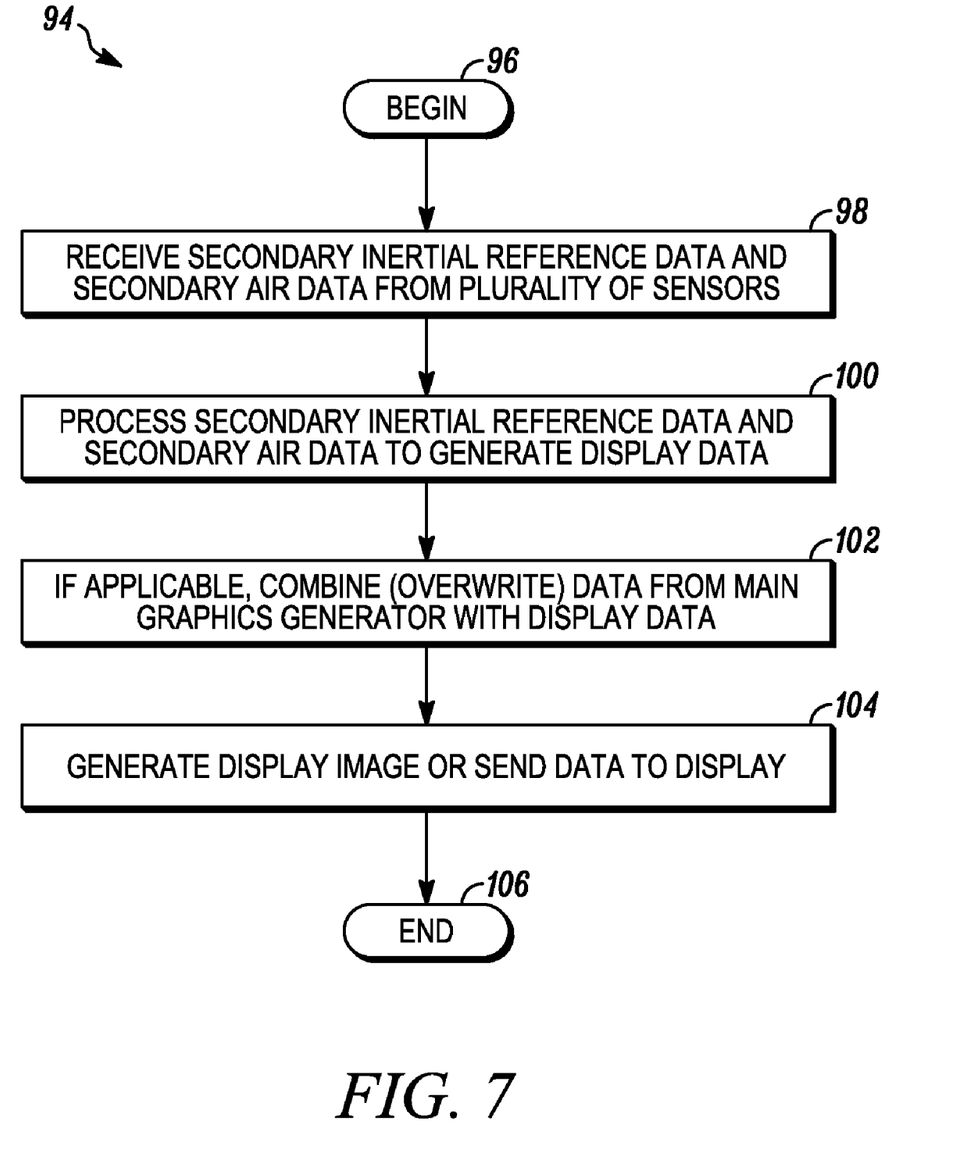
FIG. 7 is a flow chart diagram of an exemplary method for displaying standby instrument data.

Turning to FIG. 7, an exemplary method 94 for displaying standby instrument data is depicted. Method 94 begins (step 96) with the receipt of secondary inertial reference data and secondary air data (along with perhaps other sensor data) from a plurality of sensors (step 98). The secondary inertial reference data and secondary air data may be received in a secondary AADIRS module. The AADIRS module may then process the secondary inertial reference data and secondary air data to generate display data (step 100). If applicable (such as an embodiment where a combiner is used, or the combining or selection functionality is integrated into a main display), the main graphics generator data may be combined (or overwritten) with display data from the AADIRS module (step 102). The display image may then be generated, or the display data may be sent to the display (step 104). The method 94 then ends (step 106).

It is important to note that while the present invention has been described in the context of a fully functioning navigation and control system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. An augmented air data and inertial reference system (AADIRS) serving as a standby instrument on an aircraft, comprising:
   a secondary air data and inertial reference system (ADIRS) including a secondary air data module coupled to a secondary inertial reference module, the secondary air data and inertial reference system configured to derive secondary air data and inertial reference data using the secondary air data module and the secondary inertial reference module, the secondary inertial reference system further configured to provide the second air data and inertial reference data to a flight control system for use as a backup source of data for control of the aircraft; and
   a graphics module coupled to the secondary air data and inertial reference system and a display, the graphics module configured to receive the secondary air data and inertial reference data and process the secondary air and inertial reference data to generate graphics data, the graphics module further configured to provide the graphics data to the display to generate backup instrumentation on the display,
   wherein the secondary ADIRS and the graphics module are configured to provide graphics data to a main display panel to generate backup instrumentation on the main display panel along a signal pathway independent from a primary data bus of the aircraft.

2. The standby instrument of claim 1, wherein the secondary inertial reference and secondary air data modules are in electrical communication with a plurality of sensors.

3. The standby instrument of claim 1, wherein the graphics module is integrated into the display.

4. The standby instrument of claim 2, further including a power supply coupled to the secondary air data and inertial reference system to provide power.

5. The standby instrument of claim 1, wherein the secondary ADIRS and the graphics module are also configured to display backup instrumentation on an alternate display panel or a display hidden in normal conditions and selectively made visible.

6. The standby instrument of claim 5, further including a combiner in electrical communication with the graphics module and a main graphics generator of the aircraft that overwrites data passed from the main graphics generator to the portion of the main display panel with data from the graphics module.

7. The standby instrument of claim 5, further including an alternate display panel in electrical communication with the graphics module.

8. The standby instrument of claim 1, wherein the secondary inertial reference module, the secondary air data module, and the graphics module are integrated into a single unit.

9. The standby instrument of claim 5, further including a switch coupled to the graphics module adapted for selectively expanding or reducing the backup instrumentation on a portion of the main display panel, the alternate display panel, or the display hidden in normal conditions.

10. The standby instrument of claim 1, wherein the display is fully analyzable.

11. A standby instrument on an aircraft, comprising:
a secondary air data and inertial reference system (ADIRS) configured to derive secondary air data and inertial reference data using a secondary air data module and a secondary inertial reference module, and further configured to provide the secondary air data and inertial reference data to a flight control system for use as a backup source of data for control of the aircraft; and
a graphics module configured to process the secondary air data and inertial reference data to generate graphics data, and further configured to provide the graphics data to a display to generate backup instrumentation on the display,
wherein the secondary ADIRS and the graphics module are configured to provide graphics data to a main display panel to generate backup instrumentation on the main display panel along a signal pathway independent from a primary data bus of the aircraft.

12. The standby instrument of claim 11, further comprising sensors configured to receive the secondary inertial reference data and the secondary air data.

13. The standby instrument of claim 11, wherein the graphics module is further configured to display the graphics data on a portion of the main display panel.

14. The standby instrument of claim 11, wherein the graphics module is further configured to provide the graphics data to an alternate display panel.

15. The standby instrument of claim 13, further comprising a combiner configured to overwrite pixel data passed from a main graphics generator of the aircraft to the portion of the main display panel with the graphics data.

16. The standby instrument of claim 13, wherein the graphics module is further configure to expand or reduce the image on the portion of the main display panel.

17. A method for displaying standby instrument data on a main display of an aircraft, comprising:
deriving secondary air data and inertial reference data using a secondary air data module and a secondary inertial reference module;
providing the secondary air data and inertial reference data to a flight control system for use as a backup source of data for control of the aircraft;
processing the secondary air data and inertial reference data to generate graphics data;
and providing the graphics data to the main display to generate backup instrumentation on the main display along a signal pathway independent from a primary data bus of the aircraft.

18. The method of claim 17, wherein providing the graphics data to a display further includes generating a display image on a portion of a main display panel.

19. The method of claim 17, wherein providing the graphics data to a display further includes generating a display image on an alternate display panel.

20. The method of claim 17, further including combining the graphics data with main display data from a main graphics generator of the aircraft, the graphics data overwriting the main display data.

21. A standby instrument for an aircraft having a main display panel, comprising:
a flight control system providing secondary air data and inertial reference data; and
a graphics module coupled to the flight control system and the main display panel, the graphics module configured to receive the secondary air data and inertial reference data and process the secondary air data and inertial reference data to generate graphics data, the graphics module further configured to provide the graphics data to the main display panel to generate backup instrumentation on the main display panel along a signal pathway independent from a primary data bus of the aircraft.

22. The standby instrument of claim 21, wherein the graphics module is further configured to display the backup instrumentation on an alternate display panel, or a portion of the main display panel or alternate display panel.

23. The standby instrument of claim 21, wherein the graphics data is selectable to generate the backup instrumentation according to a first size, position, or display output.

* * * * *

UNITED STATES PATENT AND TRADEMARK OFFICE
CERTIFICATE OF CORRECTION

| | | |
|---|---|---|
| PATENT NO. | : 8,073,580 B2 | Page 1 of 1 |
| APPLICATION NO. | : 11/929111 | |
| DATED | : December 6, 2011 | |
| INVENTOR(S) | : Nutaro et al. | |

It is certified that error appears in the above-identified patent and that said Letters Patent is hereby corrected as shown below:

In The Claims:

Column 9, line 44, Claim 16, "configure" should be changed to --configured--.

Signed and Sealed this
Fifth Day of June, 2012

David J. Kappos
*Director of the United States Patent and Trademark Office*